H. H. WESTINGHOUSE.
INERTIA GOVERNOR FOR AIR BRAKES.
APPLICATION FILED JULY 29, 1910.
1,018,596.
Patented Feb. 27, 1912.
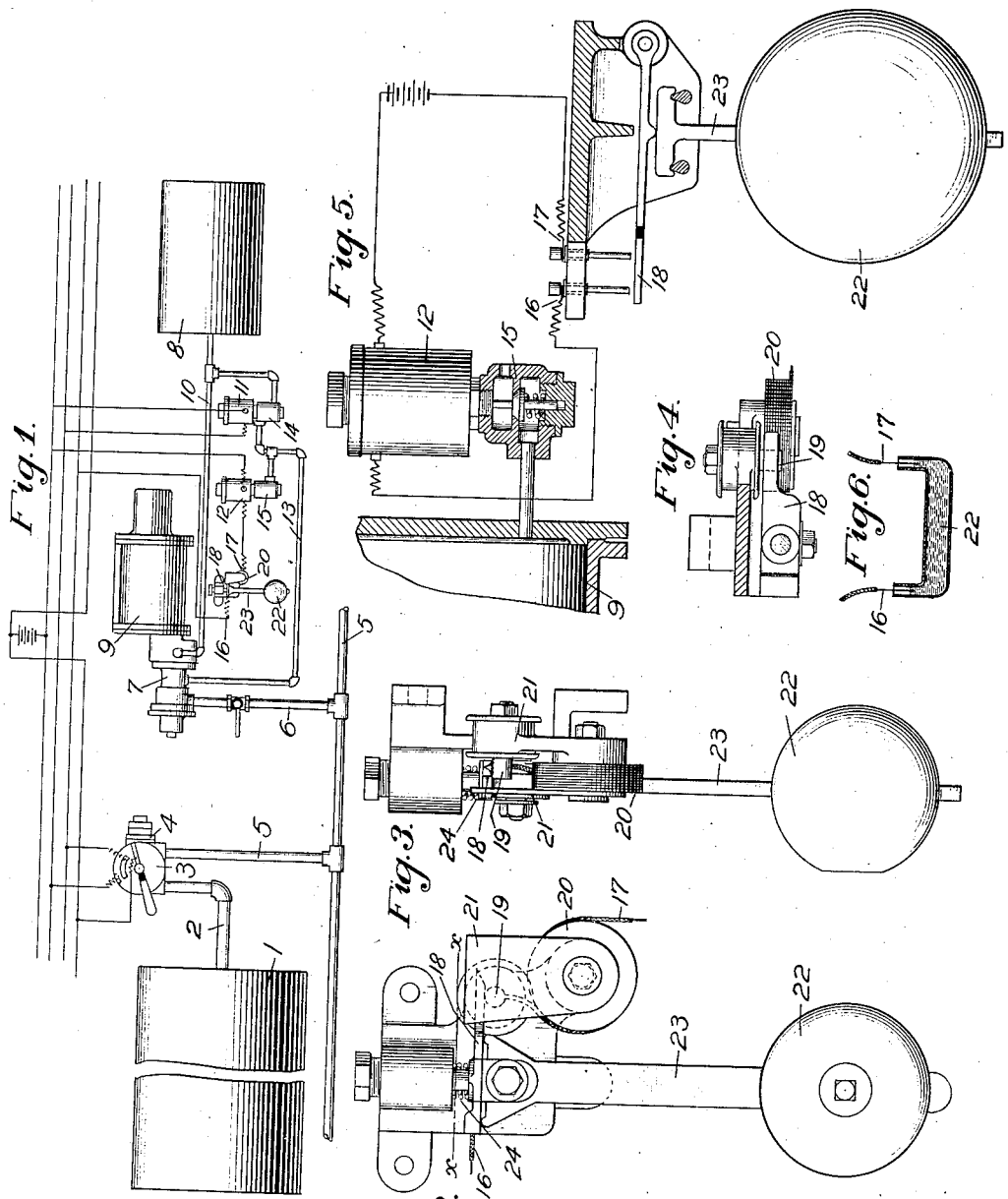
WITNESSES
INVENTOR
Henry H. Westinghouse
by E. Wright
Att'y.

UNITED STATES PATENT OFFICE.

HENRY H. WESTINGHOUSE, OF NEW YORK, N. Y., ASSIGNOR TO THE WESTINGHOUSE AIR BRAKE COMPANY, OF PITTSBURGH, PENNSYLVANIA, A CORPORATION OF PENNSYLVANIA.

INERTIA-GOVERNOR FOR AIR-BRAKES.

1,018,596.     Specification of Letters Patent.     Patented Feb. 27, 1912.

Application filed July 29, 1910. Serial No. 574,560.

*To all whom it may concern:*

Be it known that I, HENRY H. WESTINGHOUSE, a citizen of the United States, residing at New York, in the county of New York and State of New York, have invented new and useful Improvements in Inertia-Governors for Air-Brakes, of which the following is a specification.

This invention relates in general to fluid pressure brake apparatus for railways and more particularly to regulating the braking pressure according to the varying conditions or speed of the car or train by means of inertia governing mechanism of the type disclosed in prior Patent No. 739,918 of September 29, 1903.

My present improvement comprises the combining of an electrically operated valve device with the inertia governing mechanism whereby the braking pressure may be regulated or reduced, particularly at the close of the stop or whenever the rate of retardation, which determines the action of the inertia mechanism, is excessive. This automatic releasing action is particularly desired at or near the end of a stop since, as the speed of a car or train diminishes due to the brakes having been applied, the frictional resistance normally increases, and more particularly so just before the car comes to a complete stop sometimes producing a serious shock or lurch which is very objectionable.

Another feature of my improvement applies particularly to electro-pneumatic brake apparatus in which an electrically operated magnet valve is employed for controlling the normal release of the brake, and consists in connecting up the inertia governing mechanism so that it will also control the action of the release magnet valve and thereby effect a reduction in braking pressure when the rate of retardation is excessive, as at the close of the stop.

These and other features of my improvements will be hereinafter more fully described and set forth in the claims.

In the accompanying drawing, Figure 1 is a diagrammatic elevation of an electro-pneumatic brake apparatus embodying one form of my improvement; Fig. 2 a side elevation showing one form of inertia governor; Fig. 3 an end elevation of the same; Fig. 4 a horizontal section taken on the line $x$—$x$ of Fig. 2; Fig. 5 a diagram illustrating a slight modification; and Fig. 6 a diagrammatic section showing a modified form of the inertia weight mechanism.

According to the apparatus illustrated in Figs. 1 to 4 inclusive, the brake equipment for a car or other vehicle comprises a main reservoir 1, connected by pipe 2 to brake valve 3 which also carries switch contacts for controlling the circuits of the application and release valve magnets 11 and 12. The train brake pipe 5 leads from the brake valve throughout the train and is connected by branch pipe 6 to triple valve 7 communicating with brake cylinder 9 and through pipe 10 with auxiliary reservoir 8, this being the standard automatic air brake equipment. Pipe 13 is connected with the triple valve exhaust and its outlet to the atmosphere through valve 15 is controlled by release magnet 12, the same being energized upon application of brakes to hold this exhaust closed, and deënergized upon release of brakes to permit valve 15 to open and exhaust brake cylinder to atmosphere.

The application magnet 11 is energized in application position of brake switch to open valve 14 and supply air from reservoir 8 to brake cylinder 9 either directly or through triple valve exhaust pipe 13, as indicated in Fig. 1. As thus far described this electro-pneumatic brake equipment corresponds substantially with that covered by prior Patent No. 902,184 of October 27, 1908.

According to one feature of my present improvement an inertia governor mechanism is inserted in the circuit to the release magnet 12 for also controlling the action of the release valve, said inertia governor mechanism being adapted to operate under a certain rate of retardation to open, or to permit the opening of, the release valve 15 and thereby reduce the braking pressure.

Any suitable or preferred form of inertia governor mechanism may be employed for controlling the electrically operated valve, that shown in Figs. 1 to 4 of the drawing, comprising inertia weight 22 carried on pivoted arm 23 and adapted to raise the sliding arm or plate 18 having a connection 16 with the electric circuit, and to open said circuit at contact point 19 when the weight 22 is swung in either direction from its normal vertical position. The contact point 19 is connected to the electric circuit at 17 and if desired a blow-out magnet coil 20 having poles 21 inclosing the switch point 19 may be employed for extinguishing the arc. A spring 24 may be used to normally hold the arm or plate 18 in contact with the point 19 with the circuit closed. The inertia weight is mounted and adjusted so as to remain in its normal position having no effect upon the brake system unless the rate of retardation resulting upon an application of brakes becomes excessive so that there is danger of wheel sliding or of producing objectionable shocks and jerks particularly at the end of the stop when the speed is reduced to a very low degree. Then the inertia governor will operate upon such excessive rate of retardation to control the electric circuit and cause the release valve to open, thereby reducing the braking pressure by permitting some of the air to escape from the brake cylinder so as to avoid objectionable shocks or wheel sliding and produce a smooth and comfortable stop.

According to the form of connection illustrated it will be seen that the governing mechanism has no effect whatever when the brake is not applied since at that time the circuit is open at the brake valve and there is no current supplied to the governing mechanism, but when the brake valve is turned to position for applying brakes and holding same applied the circuit is energized and the governor mechanism may then become active in controlling the braking pressure.

It will be apparent that various forms of inertia governor mechanism may be employed in the practice of my invention and that, if preferred, the release or regulating valve 15 may be normally closed and adapted to be opened by the magnet 12 when energized by the closing of the circuit, as shown in Fig. 5. In this modification the inertia weight 22 when shifted or swung from its vertical position under an excessive rate of retardation, raises the bar 18 to close the magnet valve circuit at points 16 and 17 and thereby releases air from the brake cylinder 9.

According to the modification shown in Fig. 6 the inertia weight is indicated as a small quantity of mercury inclosed in a fixed vessel and having circuit connections 16 and 17 so adjusted that the mercury will operate under an excessive rate of retardation to control the circuit and govern the magnet of the release or regulating valve, as will be readily understood.

Having now described my invention, what I claim as new and desire to secure by Letters Patent, is:—

1. In a fluid pressure brake apparatus, the combination with a manually controlled electrically operated valve device for regulating the braking pressure, of an inertia weight mechanism operating upon a certain rate of retardation to control said electric valve device.

2. In a fluid pressure brake apparatus, the combination with a manually controlled electrically operated valve device for regulating the braking pressure, of an inertia weight mechanism for controlling the circuit of said valve device.

3. In a fluid pressure brake, the combination with means for reducing the pressure with which the brake is applied, and a manually controlled electro-magnetic device for controlling the operation thereof, of an inertia weight for also governing the action of said device.

4. In a fluid pressure brake, the combination with a valve for reducing the braking pressure, and a manually controlled magnet for operating the same, of an inertia weight mechanism operating upon a certain rate of retardation to control the circuit of said magnet.

5. In a fluid pressure brake, the combination with a brake cylinder, and a manually controlled magnet valve for releasing pressure therefrom, of an inertia weight mechanism for also controlling said magnet valve.

6. In a fluid pressure brake, the combination with means for admitting fluid to apply brakes, and a manually controlled electrically operated valve for releasing brakes, of an inertia governor mechanism for also controlling said release valve.

7. In a fluid pressure brake, the combination with a release magnet valve and a brake switch for controlling same, of an inertia governor mechanism for also controlling said release magnet valve.

8. In a fluid pressure brake, the combination with a normally open release valve and a magnet for holding same closed, of an inertia governor mechanism for controlling the circuit to said magnet.

9. In a fluid pressure brake, the combination with an electrically operated valve for reducing braking pressure, of an inertia weight mechanism for controlling same, and circuit connections whereby the inertia mechanism is effective only when the brakes are applied.

10. In a fluid pressure brake, the combination with a magnet valve for reducing braking pressure, of an inertia weight mechanism for controlling the circuit to said magnet, and circuit connections whereby the inertia mechanism is effective when the brake controller or handle is set to position for holding brakes applied.

11. In a fluid pressure brake, the combination with a manually controlled electrically operated valve device for reducing braking pressure, of an inertia weight mechanism operating upon a certain rate of retardation to open the circuit governing said valve.

12. In a fluid pressure brake, the combination with a brake cylinder, a valve for releasing pressure therefrom, and a manually controlled magnet for operating said valve, of an inertia weight and switch means actuated by the movement of said weight for controlling the circuit to said magnet.

In testimony whereof I have hereunto set my hand.

HENRY H. WESTINGHOUSE.

Witnesses:
W. KAYLOR,
ALFRED K. GOVEY.